United States Patent [19]

Roberts

[11] 4,062,673

[45] Dec. 13, 1977

[54] FLASH SMELTING OF IRON WITH PRODUCTION OF HYDROGEN OF HYDROGENATION QUALITY

[75] Inventor: Edward S. Roberts, Bayside, N.Y.

[73] Assignee: Robert Ames Norton, Stamford, Conn.

[21] Appl. No.: 705,620

[22] Filed: July 15, 1976

Related U.S. Application Data

[63] Continuation-in-part of Ser. No. 643,099, Dec. 22, 1975, abandoned.

[51] Int. Cl.$^2$ ............................................. C21B 11/00
[52] U.S. Cl. ...................................................... 75/40
[58] Field of Search .............................. 75/40; 252/373

[56] References Cited

U.S. PATENT DOCUMENTS

| | | | |
|---|---|---|---|
| 3,615,355 | 10/1971 | Skinner | 75/60 |
| 3,822,125 | 7/1974 | Roberts | 75/40 |
| 3,872,025 | 3/1975 | Singleton | 75/60 UX |

*Primary Examiner*—M. J. Andrews
*Attorney, Agent, or Firm*—Robert Ames Norton; Saul Leitner

[57] ABSTRACT

Comminuted iron ore, which may be pre-reduced partly or wholly if desired, is flash smelted in a vertical shaft furnace with excess carbon, and off gases are produced from which a large amount of hydrogen is recovered. The major portion of hydrogen is a product gas which can be used for reactions, such as the production of ammonia, hydrogenation of coal, and the like, or it may be used as a cooling agent for electric generators and the like.

8 Claims, 4 Drawing Figures

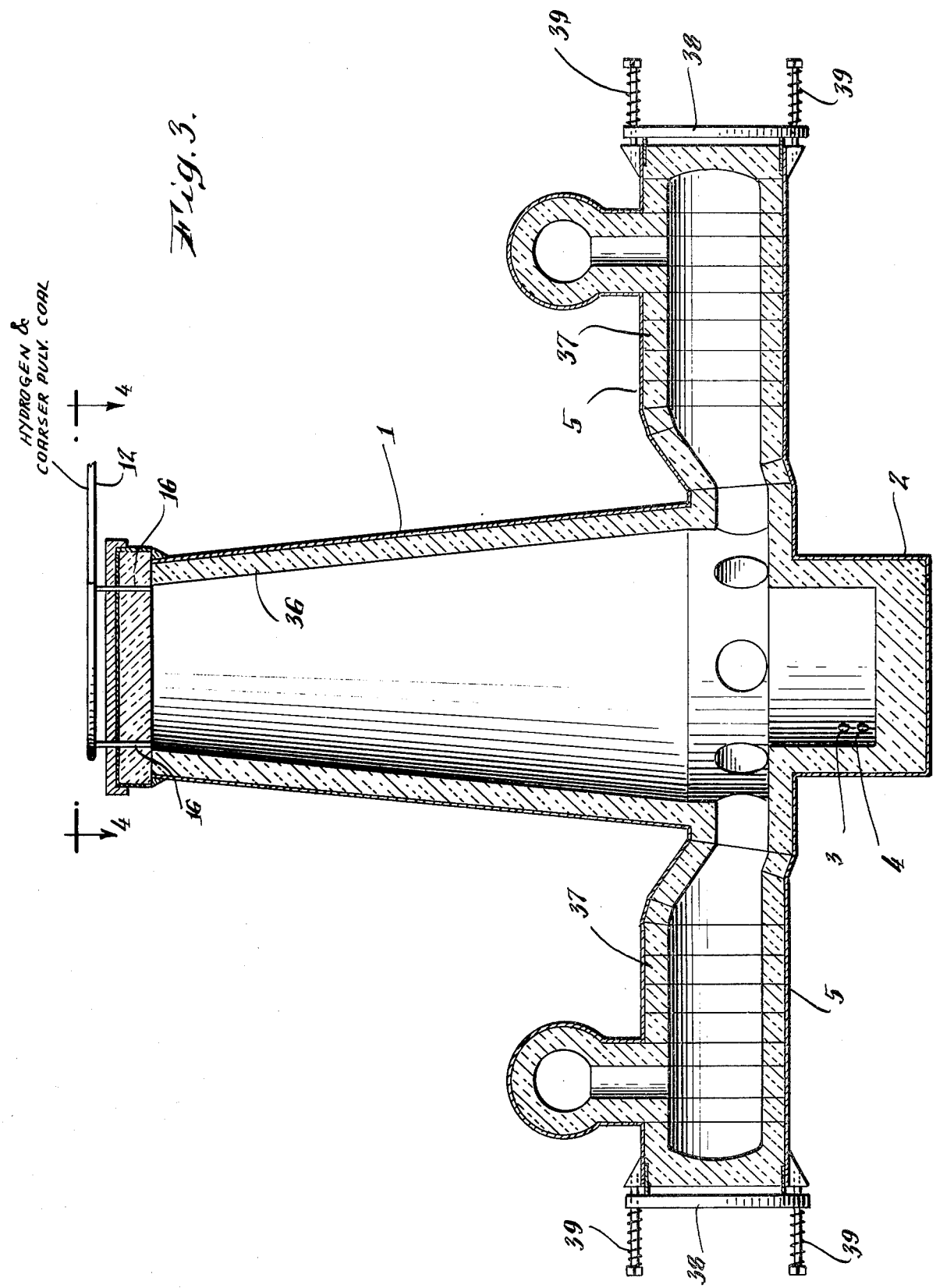

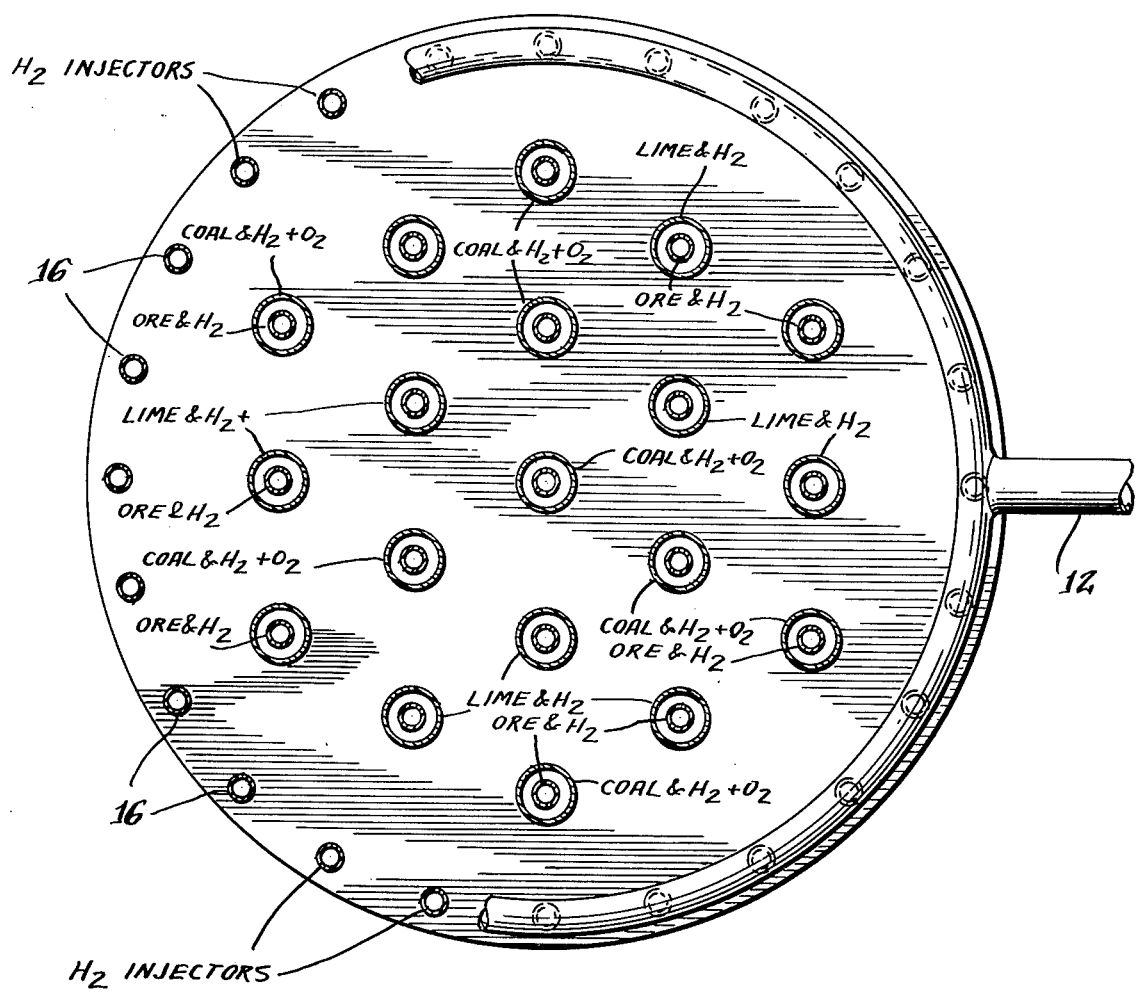

FLASH SMELTING OF IRON WITH PRODUCTION OF HYDROGEN OF HYDROGENATION QUALITY

This application is a continuation-in-part of Ser. No. 643,099 filed Dec. 22, 1975, now abandoned.

BACKGROUND OF THE INVENTION

Flash smelting of iron with finely divided coal in a vertical shaft furnace is described in the Roberts U.S. Pat. No. 3,822,125, July 2, 1974. In this patent, which is directed to iron smelting only, there is a large recirculation of hydrogen, for example from 12 to 22 or more moles per mole of iron ore, figured as $Fe_2O_3$. Part of the hydrogen is burned with oxygen to produce steam, and the off gases contain carbon monoxide, steam and excess hydrogen. After cooling the off gases, they are subjected to the water gas shift process and the carbon monoxide is transformed into carbon dioxide and hydrogen, followed by separation of the gases. When considering a flash smelting process of iron ore alone, the Roberts process is very economical as it can use coal which does not need to be coking coal and which may even contain substantial amounts of sulfur, which reacts with the limestone present in the smelting and appears as calcium sulfide in the slag.

SUMMARY OF THE INVENTION

The present invention, while flash smelting finely divided iron ore and coal, as is the case in the Roberts patent above referred to, is an improved process which combines flash smelting of iron with the production of a large amount of hydrogen, or a mixture of hydrogen and carbon monoxide, which are of value in reactions such as the production of ammonia, methanol, synthetic methane, hydrogenation of coal, and similar processes or for other uses, such as cooling of electric generators and the like. The hydrogen represents a much more valuable material than powdered coal and particularly powdered coal of lower quality. The value of the hydrogen has rapidly increased in recent times with the shortage of hydrocarbons, such as natural gas, petroleum and the like, in the United States, which has necessitated the importation of large amounts of petroleum hydrocarbons at very greatly increased prices. In the present process instead of recycling a large amount of hydrogen, as in the Roberts process, which uses it as fuel and as part of the reducing agent, the heating is effected with much cheaper coal and the hydrogen produced is utilized for processes or other purposes for which its value is markedly greater than that of coal. When the relatively high value of hydrogen is taken into consideration, the present invention represents a much more economical overall process than that described in the Roberts patent. It also shares with the Roberts patent the great advantage of flash smelting iron with coal, and particularly cheap, relatively low grade coal which may contain considerable amounts of sulfur. The present process can be operated under more highly reducing conditions than in the Roberts patent, making the removal of sulfur in the slag always possible. The present process really represents a combination of flash smelting of iron ore with the production of high grade and valuable hydrogen in essentially the same equipment.

In the present invention the excess hydrogen, which was recycled in the Roberts patent, is replaced to a large extent with the much cheaper, low quality coal. Looking at it another way, the enhanced value of the production of a large amount of hydrogen which is not burned may pay for the whole cost of iron smelting or for a large proportion of it. Also, the present process represents a very economical method of producing high grade, valuable hydrogen from low quality coal because there is a marked saving in equipment cost since the same equipment needed for the flash smelting of the iron ore does double duty in producing hydrogen. All of the smelting advantages of the Roberts patent are retained; and the present invention, therefore, is not a compromise in which one advantage is obtained at the cost of others.

While the present invention does recycle some hydrogen, it is a very small amount compared to the large recycling in the Roberts patent, this is needed only for suspending the finely divided fuel, iron ore, and other solids and to perform the added function of protecting fire brick in the furnace from damage due to contact with molten iron oxide. For these important functions, a relatively very minor amount of the hydrogen produced needs to be recycled and passes through the furnace and out. The amounts depend on the final ratio of hydrogen to water vapor and hence the quantity of off gases which are desired.

Since the quantity of coal introduced relative to iron ore and oxygen is held sufficiently high that upon completion of the reactions the molten iron contains dissolved carbon and the gas contains less than 15% of either $CO_2$ or $H_2O$ and, the oxygen partial pressure will be well below that at which a separate phase of liquid ferrous oxide can be produced, that is, below about $1.2 \times 10^{-8}$ atm. at 1900° K. A small portion of the recycled hydrogen may be introduced with some more coarsely ground coal adjacent the fire brick walls of the shaft furnace to protect the fire brick lining the furnace from slagging with molten iron oxide, either by reducing any molten iron oxide produced before it can strike the fire brick or by hindering the arrival of molten oxide droplets at the wall or furnace bottom. Part of the recycled hydrogen is oxidized to water vapor, but this is again partially reduced to hydrogen by carbon from the coal, producing carbon monoxide as well. The hydrogen that is oxidized is not wasted and the valuable function of protecting the fire brick is obtained without significant additional cost.

From the lower part of the shaft furnace, above the point where molten slag and iron collects and is tapped off, there is provided a series of generally horizontal settling chambers, for example eight or more. This permits the settling out of droplets of molten slag and iron, and the settling chambers have a slight slope so that the drops settling out flow back into the furnace and are removed with the main portion of slag and pig iron therefrom.

In the Roberts patent the off gases are cooled by quenching with steam, which also further prevents a disproportionation of carbon monoxide, and the carbon monoxide content of the off gases with further amounts of steam is subjected to the water gas shift process to produce carbon dioxide and hydrogen, which are then separated from each other. In the Roberts patent the amount of hydrogen produced is mostly recycled, but in the present invention, as has been mentioned above, only a small amount is recycled and the major portion becomes a valuable product, hydrogen, which is so important a feature of the added economies of the combined process of the present invention. The same procedure is, of course, followed with the off gases of the present invention but their composition is quite different: The content of carbon monoxide is higher and the content of hydrogen is lower.

As there is a considerable amount of waste heat in the gas, it is possible to utilize this heat, not only to generate needed steam but also to produce power. But if power is produced, less of the needed steam can be produced. Therefore, it is usually preferable not to produce power. When the power generation is not used, this, of course, saves considerable equipment cost, and, where power is obtainable relatively cheaply the savings in equipment may be worth more than the power generated. The fact that there are several alternatives in the present invention represents a very desirable flexibility or versatility since the most efficient overall process may be employed.

In the conventional water gas process and catalytic production of hydrogen therefrom by shift catalysis, there is also produced large corresponding amounts of carbon dioxide; in fact the amount of carbon dioxide produced in the present process is substantially greater than in that of the Roberts patent since a large excess of usable, high quality hydrogen is one of the products. The carbon dioxide may be used for any desired purpose, and some or all of it may be used for purging air from the finely divided solids which are introduced into the shaft furnace. If air is not purged, the nitrogen content requires further heating, which is undesirable. The use of part at least of the carbon dioxide for preventing nitrogen contamination of the product gas can very effectively be done by purging air from the raw material followed by grinding or pulverizing under a carbon dioxide atmosphere. This can be done in conventional apparatus, and so while it is a further advantage of the present invention, considered as a process, it does not require any special equipment.

With the enormous production of iron, in excess of one hundred million tons a year, there is a potential of producing hydrogen from the carbon monoxide or a mixture of hydrogen and carbon monoxide in the order of $1.35 \times 10^{11}$ kilogram moles per year, which is vastly in excess of any current demand for ammonia or methanol. To the extent that hydrogen can be used in such processes, it is preferred; but if there remain large amounts of hydrogen, the cost in the combined process is so low that, with the rising costs of natural gas and liquid hydrocarbons, hydrogenation of coal to produce hydrocarbons, or the production of methane from hydrogen and carbon monoxide, become economically worthwhile and are alternative uses for the large amounts of hydrogen which can potentially be produced by the present invention. With the rising price of hydrocarbon fuels and their limited reserves, treatment of relatively cheap coal with the economically produced hydrogen of the present invention represents an attractive solution to some of the current energy problems. Of course, when coal is hydrogenated to produce hydrocarbon, the resulting hydrocarbons may be obtained with very low sulfur content, in other words they are very clean fuels; and the fact that the low cost hydrogen of the present invention may be useful in solving energy problems is a desirable advantage of the present invention. In referring to hydrocarbon fuel, this term is used to refer to those which are predominantly hydrocarbons, such as methane, petroleum hydrocarbons and the like. Actually, of course, much of some coals is present in the form of hydrocarbons but coal is not generally considered as a hydrocarbon fuel, and this narrow terminology is used in the present invention.

It should be noted that under the highly reducing conditions obtaining at high temperature in the furnace that the following reactions will take place:

I. $SiO_2 + 2C = Si + 2CO$

II. $CaO + C + S = CaS + CO$

Where reaction I provides the desired amount of silicon dissolved in the iron, and reaction II causes sulfur, that may be introduced in the coal or otherwise, to be removed from the system as CaS in the slag. If desired, sulfur may be recovered from the CaS by:

III. $CaS + H_2O + CO_2 = CaCO_3 + H_2S$, then elemental sulfur can be produced from the $H_2S$ in a Claus plant. Some of the $CO_2$ produced in the production of hydrogen from the off gas carbon monoxide is available for reaction III.

It will be noted that the various uses of the hydrogen produced by the present invention are mentioned to show the high degree of practical utility of the present invention. However, the exact way in which the low cost, high quality hydrogen of the present invention is used does not form a part of the process of the invention, which, therefore, may be considered as stopping when the hydrogen is produced as a product gas.

BRIEF DESCRIPTION OF THE DRAWINGS

FIG. 3 is a more detailed structural illustration of the shaft furnace; and

FIG. 4 is a plan view of the top of the furnace shown in FIGS. 1 and 3.

DESCRIPTION OF THE PREFERRED EMBODIMENTS

Figure 1:
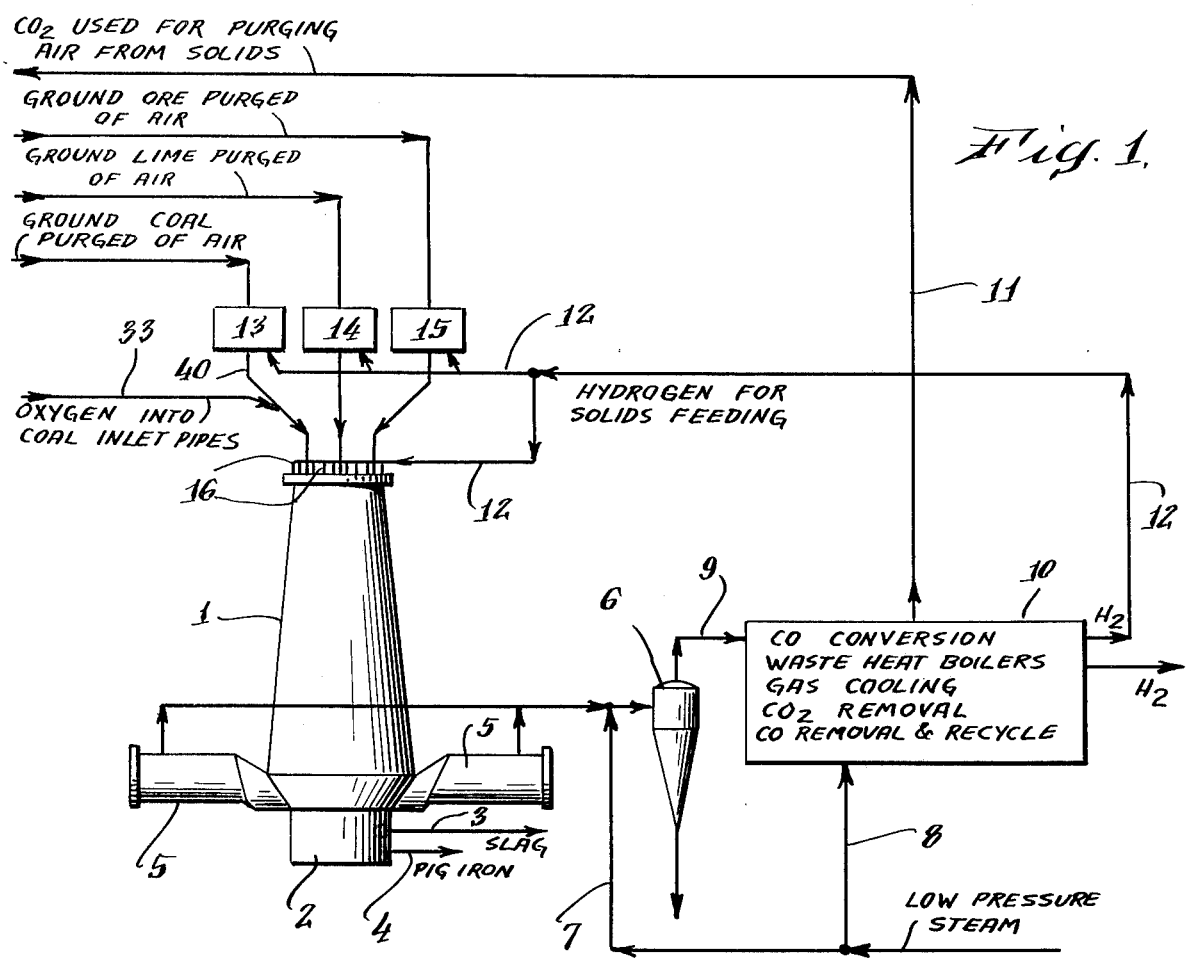
FIG. 1 is a diagrammatic showing of the overall basic process of the present invention.

The basic overall process, which is shown in diagrammatic or semi-diagrammatic form in FIG. 1 and in more detail in FIG. 3, will first be described. The vertical shaft furnace 1 with a lower portion 2 for collecting slag and molten iron is in semi-diagrammatic form as these furnaces are conventional pieces of apparatus and are, of course, always lined with a refractory fire brick 36. However, the showing in FIG. 1 does not show these conventional details.

Three materials are fed into the top of the furnace 1: ground coal from a supply 12, ground iron ore from a supply 15, and ground lime from a supply 14. Each of these finely divided materials is suspended with recycled hydrogen, as indicated on the drawing. The powdered coal is introduced through conventional burners with the requisite amount of oxygen, symbolized by a line coming in at 33 and appropriately labelled. The oxygen, as usual, is commercial oxygen and is about 99.8% chemically pure. It does, however, contain a little argon and nitrogen but allows the maintenance of the desired temperature and the highly reducing conditions of low carbon dioxide and water vapor content, which could not be done if air were used in place of oxygen. The burners, which are, of course, a set of parallel multiple burners, as is normal in shaft furnaces, are protected against melting by cooling, usually water cooling. Such burners are completely conventional, and therefore the showing on the drawing of these elements is almost purely diagrammatic. The suspending hydrogen, which is shown, performs an incidental additional function in that it makes the flame easier to ignite.

The amount of coal is in excess of the stoichiometrical amount required for reducing the iron ore as a portion supplies the heat for the process. With the oxygen introduced in the burners combustion produces large amounts of carbon monoxide with smaller amounts of carbon dioxide or water vapor after completion of all reactions. The hot hydrogen and carbon monoxide reduce the iron ore, and part of the carbon dioxide and water so formed are reduced to carbon monoxide and hydrogen by heated powdered coal, and a rain of reduced iron in molten form falls down through the shaft furnace and accumulates in the lower portion 2 where the lime forms slag on top of the molten iron and is tapped off at 3, the iron being tapped at 4.

Communicating with the lower portion of the shaft furnace are a series, for example eight or more, radial settling chambers 5. These chambers slope slightly toward the furnace so that droplets of molten iron and slag which settle in them flow down and join the main portions in the bottom section 2. The multiple settling chambers permit moderate diameters, and of course these settling chambers are also lined with conventional fire brick, rings or blocks 37, of FIG. 3, which, however, are not shown in the diagrammatic illustration of FIG. 1. A portion of the recycled hydrogen with coarser coal is introduced around the periphery of the furnace through openings 16, best seen in FIG. 4. This forms a curtain of hydrogen in front of the fire brick lining and prevents contact with any molten iron oxide, which would otherwise slag the refractories. The hydrogen tends to reduce this, either before any contact with the fire brick results or very soon thereafter so that no molten iron oxide remains in contact with the fire brick for a sufficient time to cause severe erosion. Part of the hydrogen that is oxidized to water vapor is, of course, recovered as hydrogen in passing down through the furnace where the water vapor is reduced by the carbon and appears in the off gases as hydrogen and carbon monoxide. Any coal that is introduced with the protective hydrogen will carbonize as it is heated on the way down, and some of this will settle out on the bottom of the furnace, where it will help to protect the refractory.

As the temperature of the off gases leaving the settling chambers 5 is quite high, they are quenched with low pressure steam coming in through the line 7 to bring the temperature below the melting points of any entrained droplets of iron or slag before they pass into a cyclone 6 for removal of solid particles. This addition of steam also prevents disproportionation of carbon monoxide to carbon and carbon dioxide as the temperature is lowered through the waste heat boilers and economizers.

After removing solid particles in the cyclone separator 6, which is shown diagrammatically, the gases flow through line 9 to an off gas treating portion of the process. This is shown on FIG. 1 as a rectangle at 10 and includes some gas cooling further by more low pressure steam coming in at the line 8 and conversion of carbon monoxide to carbon dioxide and hydrogen in a conventional catalytic water gas shift element. The temperature is also high enough so that the gases may be introduced into waste heat boilers, producing low pressure steam and/or some power. From the cooled gases carbon dioxide is removed through the line 11, where, as indicated on FIG. 1, it is used for purging air from the solids introduced into the shaft furnace. Then, if hydrogen is the desired product, remaining carbon monoxide is removed and recycled to the shift converters. The hydrogen passes out, as indicated, a major portion going to a product gas where it can be used for any purposes for which hydrogenation quality hydrogen is useful. A smaller portion is recycled through the line 12 for suspending finely divided materials going into the shaft furnace and for forming a curtain along the walls of the shaft furnace to protect the fire brick lining, as has been described.

The amount of carbon dioxide leaving through the line 11 may represent only part of the carbon dioxide produced, and excess carbon dioxide can be used for any desired purpose. In other words, the present invention ceases when carbon dioxide and hydrogen are produced and separated and separately removed.

Figure 2:
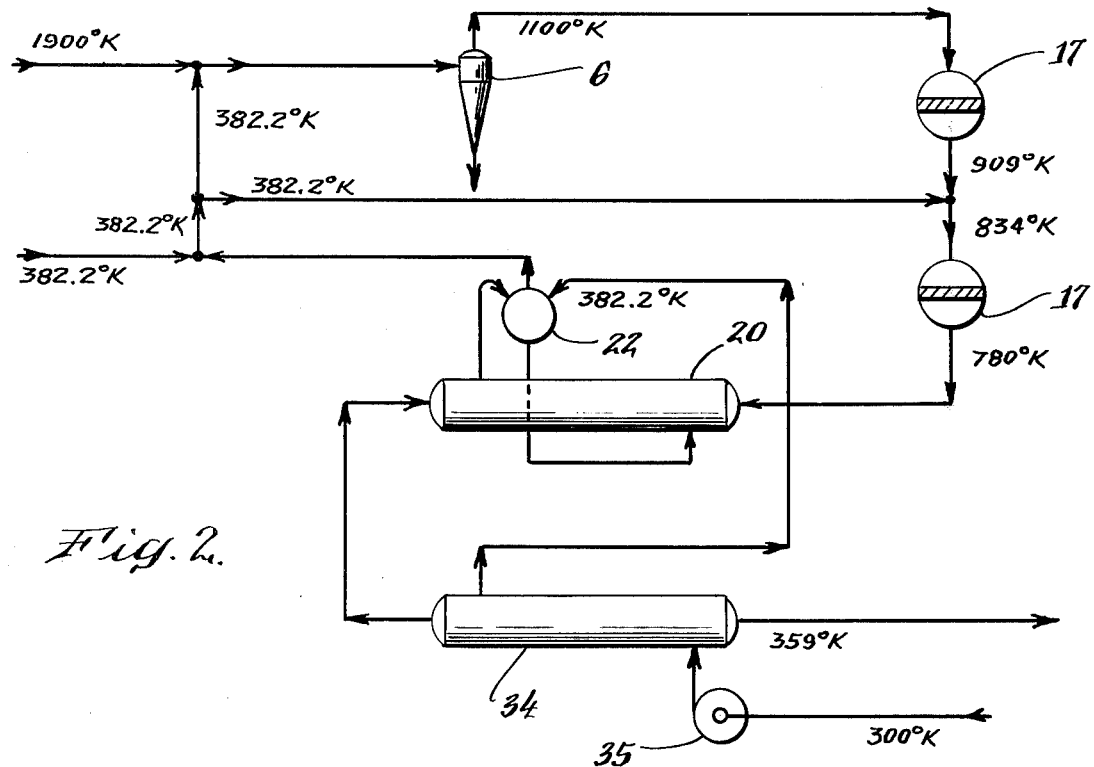
FIG. 2 is a similar diagrammatic flow sheet of a simplified process in which power is not produced.

FIg. 2 represents in somewhat more detail, although still diagrammatic or semi-diagrammatic, a variant of the processing of the off gases with no generation of power. The off gases at a temperature of about 1900° K. are quenched with 382° K. steam to 1100° K. before they enter the cyclone, which, as in FIG. 1, is numbered 6. At 1100° K. any molten droplets of iron or slag will be frozen, and the quantity of steam added is sufficient to prevent disproportionation of carbon monoxide until the gases are cooled below 1100° K. Also, the added steam is sufficient to allow the desired conversion of carbon monoxide in the first shift converter 17. From the cyclone, the gases pass, in series, through two conventional water gas shift catalytic converters 17. As these are conventional elements, they are shown diagrammatically with an indication of the water gas shift catalyst bed by hatching. Since the water gas shift is somewhat exothermic, the temperature of the gases leaving the first catalytic element 17 is about 1212° K. A certain amount of low pressure steam at 382° K. is admixed to bring down the temperature of the gases entering the second container 17 to about 950° K. In the reaction in this second catalytic converter where the remainder of the water gas shift reaction takes place, the temperature rises a little, to 965° K. This gas then passes into waste heat boiler 20, also shown diagrammatically, and leaves at 700° K. Then it passes through the third catalytic converter 27, entering at a temperature of 700° K. and leaving at a temperature of about 745° K. The gas then flows into the waste heat boiler 20 with a steam separator 22 and leaves at a temperature of about 458° K. and passes through an economizer 30 which serves to preheat the boiler feed water from 298° K. to 382° K. The gases leaving the economizer 30 at 340° K pass on through further cooling, (not shown), and on through a $CO_2$ removal system, (also not shown).

Low pressure steam is produced at 382° K. in the three waste heat boilers 20, which are fed boiler feed water at 382° K. from the economizer which is fed by the pump 35. The steam from the waste heat boilers 20 joins further steam at the same temperature from the exhaust of a steam turbine which is external to the system and which is fed by an auxiliary boiler which is also external to the system.

Clearly, high pressure steam can be generated and superheated, then passed through power generating steam turbine before being used in the process, but much less of the required low pressure steam would be produced than in the system of FIG. 2, which requires much less auxiliary steam to be drawn from outside the system than if power were to be produced. This means a much lower cost system as well as a lower cost auxiliary boiler and steam turbine, which is advantageous where the extra power production is not needed.

FIG. 3, which should be read with FIG. 4, shows some of the structure of the furnace, notably the refractory lining 36. The horizontal chambers are, of course, also lined with refractories 37. Covers 38 hold the brick linings in place and are pressed against them by spring loaded bolts 39, to allow different expansions of linings and shells.

Arrangements are made to inject powdered coal suspended in hydrogen through a number of burners also supplied with oxygen in the top of the furnace. Injectors for ground ore and injectors for lime are also placed in these same burners. The general layout of the burners can be seen in FIG. 4, which is a plan view but taken below the supply sources for coal ore and lime, and as the plan view is taken in a plane below the point where oxygen has been introduced, each of the burners has already received its share of oxygen. The burners alternate between burners which have coal ore and oxygen and those which have coal, lime and oxygen. As there are a large number of burners, only a few of them are shown, with legends indicating what is going through them. The other burners, of course, which are seen as circles but without legends, in order not to confuse the drawing, are alternated in the same manner. After the content has passed through the top of the shaft, the burners are, of course, lit and from there on constitute flames, which reduce the ore. As an excess of coal is burned to supply heat as well as reducing the ore and to supply the necessary amount of carbon monoxide, it is convenient to introduce coal through the burners which also receive lime in order to have more uniform flame distribution. Of course, the small amount of hydrogen, as has been described and as has been indicated by legend in FIG. 4, also burns. The illustration in FIG. 4 is diagrammatic and shows no details of these injectors, which are standard and are commercially available, and no special design of burner is needed. In FIG. 1, which is really a diagrammatic flow sheet of the process, the oxygen is shown coming in from a source which is not illustrated as the production of commercial oxygen is a conventional procedure and the particular apparatus used forms no part of the present invention.

The description, both in the more general summary of the invention and in the description of the preferred embodiments, is an overall description of the process, and while the drawings show temperatures, they do not show the proportions of the various ingredients nor do they show the heat balance.

It is assumed that the iron ore concentrates have the following composition:

|  | wt. % |
|---|---|
| $Fe_2O_3$ | 92.93 |
| $SiO_2$ | 7.07 | and that bituminous coal is used having an ultimate analysis on a dry basis of:

|  | wt. % |
|---|---|
| C | 69.7 |
| H | 5.3 |
| N | 1.3 |
| S | 0.8 |
| O | 0.9 |
| ash | 10.0 |
|  | 100.0 | and that the higher heating value dry is 7055.56 kcal/kg of dry coal, and that the ash requires 10.27 kg. of CaO for slagging per 100 kg. of coal and that the concentrates require 12 kg. of CaO per 100 kg. of concentrate, and it is assumed that 3 kg. moles of the $H_2$ produced are recycled to feed the solids and to protect the refractories.

If the ratio of coal to oxygen is held so as to produce a ratio of 2 moles of $H_2$ to 1 mole of $H_2O$ in the off gas, then the composition of the off gas will be:

|  | mole % |
|---|---|
| CO | 53.32 |
| $CO_2$ | 6.41 |
| $H_2$ | 26.55 |
| $H_2O$ | 13.28 |
| $N_2$ | 0.44 |
|  | 100.00 |

Allowing about 10% for heat losses, the amount of dry coal needed is 2.4 kg. per kg. of iron produced and the oxygen required is 2.14 kg. of $O_2$/kg. of iron produced. The amount of hydrogen or hydrogen plus carbon monoxide that would be produced is 0.1533 kg. moles per kg. Fe or 0.064 kg. moles per kg. of coal.

If, on the other hand, the ratio of coal to oxygen is held so as to produce a ratio of 4 moles of $H_2$ to 1 mole of $H_2O$ in the off gas, then the composition of the off gas will be:

|  | mole % |
|---|---|
| CO | 59.62 |
| $CO_2$ | 3.58 |
| $H_2$ | 29.03 |
| $H_2O$ | 7.26 |
| $N_2$ | 0.51 |
|  | 100.00 |

Allowing 10% for heat losses, dry coal consumption would be 4.17 kg. per kg. of Fe and the oxygen required is 3.52 kg. of $O_2$/kg. of iron. The amount of hydrogen or hydrogen plus carbon monoxide that would be produced is 0.3066 kg. moles per kg. of Fe ore or 0.074 kg. moles per kg. of coal.

Referring to FIG. 2, the proportions are calculated on the basis of 100 kg. moles of off gases and assuming a ratio of $H_2$ to $H_2O$ of two in the off gases. The heat present in a mole in kilocalories is shown and abbreviated "kcal". The heat content above 298° K. per 100 kg. moles of off gases is 1,342,245 kcal. at 1900° K. Before reaching the cyclone 6, 100 kg. moles of 382° K. steam, symbolized as $H_2O_{(v)}$, are mixed with the off gas steam. The heat content of the $H_2O_{(v)}$ is 68,082 Kcal and the off gases are brought down to 1100° K. and, of course, have a combined content of 1,410,327 kcal at 1100° K. The cooled gases, after having passed through the cyclone which serves to remove particulate solids, are led into the first water gas shift reactor 17. The gases leaving this reactor have the following composition, given in moles per 100 of entering off gas:

|  | kg. mole |
|---|---|
| CO | 27.06 |
| CO$_2$ | 32.67 |
| H$_2$ | 52.81 |
| H$_2$O | 87.02 |
| N$_2$ | 0.44 |
|  | 200.00 | and 205,834 kcal. of heat are released by the reaction. Throughout the rest of this example compositions will be in kg. moles per 100 kg. mole of entering off gases.

The gases leaving the first reactor are mixed with 100 more kg. moles of 382° K. steam, introducing 68,082 kcal., and the gases then enter the second water gas shift converter 17 at 950° K., from which they leave at 965° K. The entering composition is the same as above except for the added 100 kg. moles of steam. After passing through this second converter, the composition is:

|  | kg. mole |
|---|---|
| CO | 19.40 |
| CO$_2$ | 40.33 |
| H$_2$ | 60.48 |
| H$_2$O | 179.35 |
| N$_2$ | 0.44 |
|  | 300.00 | and 64,120 kcal. of heat are released by the reaction.

As has been described above, the gas from the second water gas shift converter 17 passes through a first waste heat boiler 20 where the removal of 742,231 kcal. of heat evaporates 77.2 kg. moles of water which has been introduced saturated at 382° K.

The gases leaving the first waste heat boiler 20 at 700° K. are passed into a third water gas shift converter 17. The gases leaving at 745° K. have a composition:

|  | kg. mole |
|---|---|
| CO | 4.08 |
| CO$_2$ | 55.65 |
| H$_2$ | 75.79 |
| H$_2$O | 164.04 |
| N$_2$ | 0.44 |
|  | 300.00 | and 63,569 kcal. of heat are released by the reaction. This gas then passes through the second waste heat boiler 20 where it generates 78.8 kg. moles of H$_2$O vapor at 382° K. by the transfer of 757,263 kcal. of heat to water that enters saturated at 382° K.

After leaving the second waste heat boiler, at a temperature of 458° K., the heat content of the gas is 385,647 kcal. This stream is then passed through an economizer 30 where 156 kg. moles of boiler feed water are heated from 298° K. to 383° K. and from which the gas leaves at 360° K. after giving up 235,988 kcal. of heat to the water. In addition to the 156 kg. moles of steam delivered by the two waste heat boilers, 44 kg. moles of steam is brought in from outside the system to be used for gas cooling, and to prevent disproportionation of CO during cooling and to provide the water vapor required in the shift converters to produce hydrogen from the carbon monoxide.

If the gases leaving the economizer 30 at 360° K. are to be completely converted to H$_2$, they are further cooled and the CO$_2$ is removed in equipment not shown, then the remaining CO is removed and recycled to the inlet of the first shift converter. This CO recovery system is also not shown.

If ammonia is to be produced from the off gases, all of the CO would be converted to hydrogen and the needed nitrogen would be available from the air separation plant producing the oxygen required in the furnace.

If methanol is to be produced, then the ratio of hydrogen to carbon monoxide in the final gas should be two to one and some gas leaving the cyclone would be added to the gas leaving the system after the last shift converter to provide the proper ratio. If methane is to be produced, the ratio should be three hydrogens to one carbon monoxide. The iron ore may, if desired, be pre-reduced with hydrogen. When pre-reduced ore is used, smaller equipment is possible, which effects a saving in equipment cost, and it is also possible to omit the hydrogen curtain to protect the refractory lining of the furnace from corrosion by ferrous oxide. The question of which to use is purely a matter of economics. If at the location the hydrogen of the off gases does not have a high value, it may be cheaper to use some of it to pre-reduce iron ore. This hydrogen forms steam and can be recovered in the off gas treatment equipment. However, where there is, at or near the location of the furnace, a demand for hydrogen for processes such as synthetic ammonia, methanol, and the like it is preferred to use unreduced ore. Needless to say, if the hydrogen is to be used in an ammonia plant, the oxygen plant which is required for the oxygen used in the process also produces nitrogen, which can be used in the ammonia synthesis.

I claim:

1. A process of smelting of an iron ore feed, selected from the group consisting of iron oxide and partially or wholly pre-reduced iron, to molten iron with concomitant production of product hydrogen of hydrogenation quality or a mixture of hydrogen and carbon monoxide for methanol or methane production, in combination,
   a. introducing suspended in a stream of hydrogen particulate iron oxide or pre-reduced iron oxide, a large excess of particulate carbonaceous fuel together with particulate slag-forming components and oxygen of at least commercial purity into a furnace, in such proportions that after completion of all reactions oxygen partial pressure in the furnace is below the pressure which would be in equilibrium with molten FeO as a seperate phase, separating molten iron and molten slag from off gases containing carbon monoxide, small amounts of carbon dioxide, steam, and entrained droplets, quenching the off gases with steam to a temperature at which entrained droplets are solidified and the solids can be separated, and separating said solids in the presence of sufficient steam to prevent disproportionation of carbon monoxide to carbon and carbon dioxide as the gases are further cooled,
   b. converting at least some of the carbon monoxide in the off gases after quenching to form carbon dioxide and hydrogen by the water gas shift conversion, removing the carbon dioxide from the hydrogen, the carbonaceous fuel being in sufficient excess to both reduce iron oxide and to furnish the necessary heat for the smelting, the excess of carbonaceous fuel also being sufficient to produce an off gas with less than 15% of either CO$_2$ or H$_2$O, and c. recycling a minor portion of the hydrogen not substantially in excess of that required to suspend the finely divided constituents of fuel, iron oxide or pre-reduced iron oxide, and to form a curtain protecting the walls of the equipment from corrosion by molten FeO.

2. A process according to claim 1 in which the carbonaceous fuel is coal.

3. A process according to claim 2 in which the coal is non-coking and contains substantial amounts of sulfur, and alkaline earth metal oxides and silica constitute the slagging components, most of the sulfur separating in the slag produced.

4. A process according to claim 3 in which the alkaline earth metal oxide is calcium oxide.

5. A process according to claim 1 in which the feed of particulate iron is unreduced iron oxide.

6. A process according to claim 5 in which the carbonaceous fuel is coal.

7. A process according to claim 6 in which the coal is non-coking and contains substantial amounts of sulfur, and alkaline earth metal oxides and silica constitute the slagging components, most of the sulfur separating in the slag produced.

8. A process according to claim 7 in which the alkaline earth metal oxide is calcium oxide.

* * * * *